United States Patent [19]

Zylka et al.

[11] Patent Number: 5,067,865
[45] Date of Patent: Nov. 26, 1991

[54] METHOD AND APPARATUS FOR FEEDING TABS OR DISCS TO AN AUTOMATIC STAPLE OR NAIL GUN

[75] Inventors: Karl H. Zylka, Ft. Lauderdale; Augustus M. Buckley, Jr., West Palm Beach, both of Fla.

[73] Assignee: Quick-Tab Fasteners, Inc., Pompano Beach, Fla.

[21] Appl. No.: 429,148

[22] Filed: Oct. 30, 1989

[51] Int. Cl.$^5$ ............... F16B 43/00; B27F 7/02; B42B 4/00
[52] U.S. Cl. ............... 411/531; 411/162; 411/943; 227/48; 227/50
[58] Field of Search ............... 411/154, 155, 160–164, 411/480, 531, 542, 544, 545, 943; 227/39, 48, 50

[56] References Cited

U.S. PATENT DOCUMENTS 2,069,402  2/1937  Cowlin ............... 411/162
3,481,381  12/1969  Black ............... 411/162

FOREIGN PATENT DOCUMENTS

608080  12/1978  Switzerland ............... 411/531

*Primary Examiner*—Neill R. Wilson
*Attorney, Agent, or Firm*—Eckert, Seamans, Cherin & Mellot

[57] ABSTRACT

A method of feeding the discs to the automatic staple or nail gun includes the steps of providing a plurality of discs stacked atop one another, shuttling a first disc from the stack to a position normal to the staple or nail expulsion path, and retaining that first disc at that position until the staple or nail is expelled from the gun. The apparatus includes a shuttle which is moved from a position immediately below the stack of discs to a second position at which the disc, carried by the shuttle carriage, is grasped by a clip. The clip retains the disc in a position normal to the path of staple or nail expulsion. The discs have dimples protruding from both planar surfaces of the disc. The dimples are predisposed in a predetermined pattern such that the protrusions from one surface form a pattern which is non-equivalent to the pattern formed by the protrusions extending from the other surface of the disc. This dimple pattern is in a peripherally spaced band on the disc. The shuttle carriage is configured to carry these discs on planar surfaces beyond the band of dimples.

13 Claims, 7 Drawing Sheets

METHOD AND APPARATUS FOR FEEDING TABS OR DISCS TO AN AUTOMATIC STAPLE OR NAIL GUN

BACKGROUND OF THE INVENTION

The present invention relates to a method for feeding tabs or discs to a pneumatically or electrically powered staple or nail gun and an apparatus for accomplishing the same. The particular configuration of the tabs or discs is also part of the invention.

Automatic staple or nail guns, powered by electricity or air pressure, are utilized to staple or nail tar paper or other roofing material onto the roofs of homes and buildings. Local building codes now permit the use of wide crown staples and pneumatically driven nails to attach the tar paper or roofing material to the plywood structure of the roof. However, the staples or nails must be used in conjunction with very thin, metallic (usually tin) tabs or discs. Essentially, the staples and nails are driven through these tabs or discs such that the upper part of the inverted U-shaped staple, or the head of the nail, contact the top of the disc or tab surface while the legs of the staple or the shank of the nail protrude through the tab, through the tar paper or other generally waterproof building cover, and into the underlying plywood or other type of solid roof structure In order to affix the staples or nails and discs to the roof, roofers typically grasp a single disc, place the disc in the appropriate location on the roof, position the powered automatic staple or nail gun above the disc, and then trigger the gun which then expels the staple or nail. The staple or nail, driven by a significantly large force, penetrates the tab or disc and the tar paper and is injected into the underlying solid roof structure. This procedure can be dangerous in that the roofers must manually handle the discs and accurately place the gun atop the disc before firing the gun. There is a possibility that the roofer may be injured by not withdrawing his or her hand from the disc prior to firing the staple or nail. Misplacement of the gun or staple or nail on top of the disc or tab requires that the roofer repeat the procedure to properly place the staple or nail in the central region of the tab or disc. Typically, several thousand staples or nails and discs are utilized on a single residential roof.

OBJECTS OF THE INVENTION

It is an object of the present invention to provide a method for automatically feeding the tabs or discs and eliminating the manual placement of the discs beneath the staple or nail to be fired from the gun.

It is another object of the present invention to provide a disc or tab feeding system wherein the planar surfaces of the successive discs do not contact each other.

It is a further object of the present invention to provide the quick loading of the discs or tabs into the line of firing of the staple or nail expulsion path of the automatic staple or nail gun such that the gun can be rapidly operated.

It is another object of the present invention to provide a feeding mechanism for the tabs or discs which utilizes a disc shuttle or carriage.

It is an additional object of the present invention to link the trigger safety of the automatic staple or nail gun with the loading of the tab or disc in the staple or nail expulsion path.

It is another object of the present invention to provide discs or tabs which include a plurality of dimples protruding from the planar surfaces of the tabs or discs wherein the dimples are predisposed in non-equivalent patterns on opposing planar surfaces thereof.

It is a further object of the present invention to provide a compact container for holding the discs or tabs which is removable from the staple or nail gun.

SUMMARY OF THE INVENTION

The method of feeding the discs to the automatic staple or nail gun includes the steps of providing a plurality of discs stacked atop one another, shuttling a first disc from the stack to a position normal to the staple or nail expulsion path, and retaining that first disc at that position until the staple is expelled from the gun. The apparatus includes a shuttle which is moved from a position immediately below the stack of discs to a second position at which the disc, carried by the shuttle carriage, is grasped by a clip. The clip retains the disc in a position normal to the path of expulsion. The discs have dimples protruding from both planar surfaces of the disc. The dimples are predisposed in a predetermined pattern such that the protrusions from one surface form a pattern which is nonequivalent to the pattern formed by the protrusions extending from the other surface of the disc. This dimple pattern is in a peripherally spaced band on the disc. The shuttle carriage is configured to carry these discs on planar surfaces beyond the band of dimples.

BRIEF DESCRIPTION OF THE DRAWINGS

Further objects and advantages of the present invention can be found in the detailed description of the preferred embodiments when taken in conjunction with the accompanying drawings in which:

FIG. 3 is a partial, broken away, schematic illustration of the staple gun hammer channel guide and the tab retention clip;

DETAILED DESCRIPTION OF THE PREFERRED EMBODIMENTS

The present invention relates to a method for automatically feeding tabs or discs to an automatic staple gun or automatic nail gun, an apparatus for accomplishing the same, and discs that are uniquely designed for such operation.

Figure 1A:
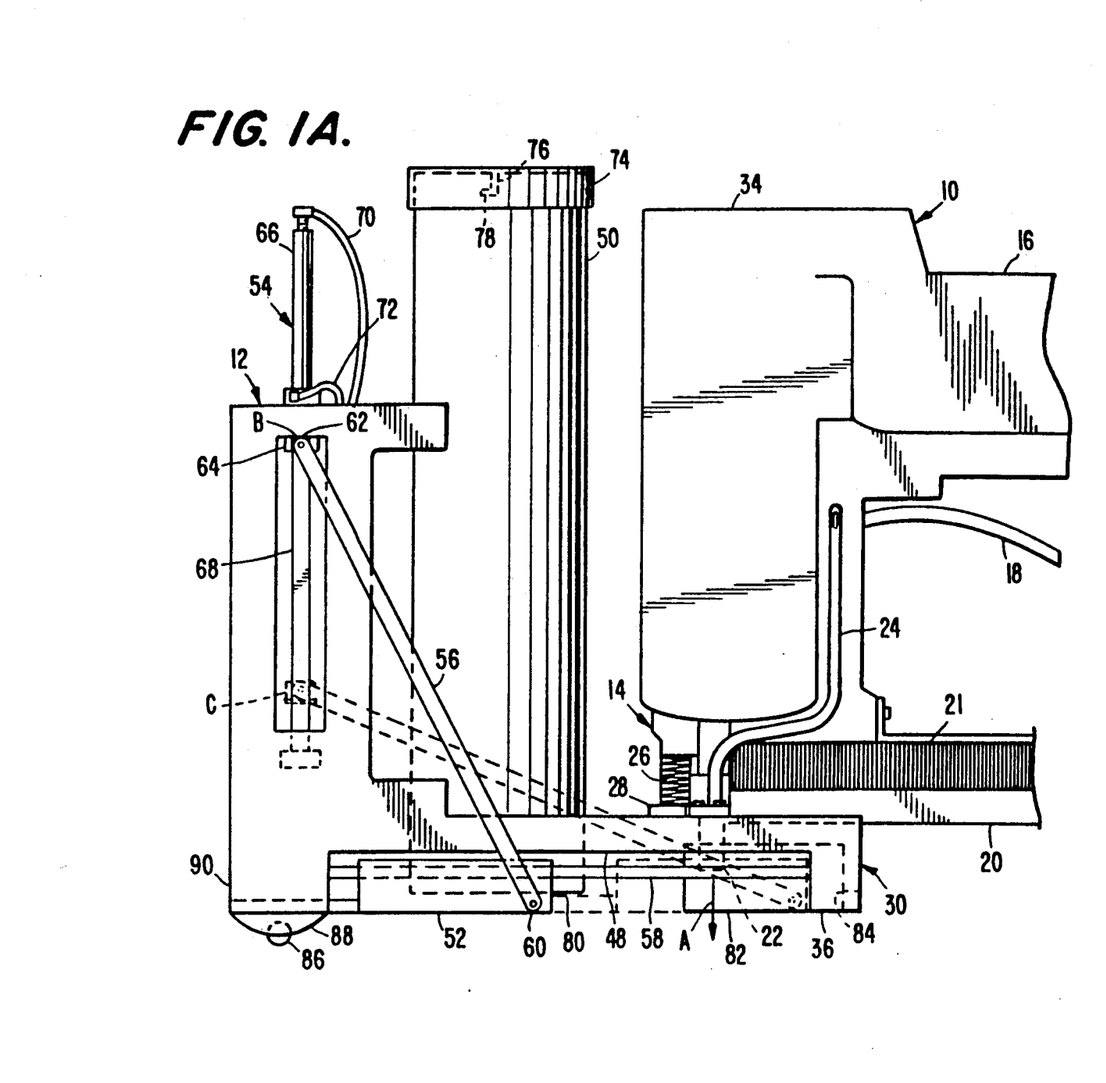
FIG. 1A is a partial, schematic illustration of an automatic staple gun with the disc feeding apparatus mounted on the gun.

FIG. 1A schematically illustrates a partial view of an automatic staple gun and the apparatus for automatically feeding the tabs or discs. As used herein the word "tab" is interchangeable with the "disc" and both refer to very thin, circular or other shaped pieces through which a wide crown staple can be expelled. Wide crown staplers can be used for shingles, roofing and siding felt, furniture frame butt joints, case goods, corrugated to wood packaging, floor installation and belt lines. In addition, these staplers could be used for lathing and insulation.

FIG. 1A illustrates a pneumatically powered, wide crown stapler 10 manufactured by Senco of Cincinnati, Ohio and sold as Model PW. The add on, automatic disc feeding apparatus 12 is mounted onto the front end 14 of the automatic staple gun. Although a pneumatically driven wide crown stapler and a pneumatically driven tab feeder are discussed herein, the stapler and feeder could be electrically powered. It is within the skill of a person of ordinary skill in the art to alter the feeder to include an electrical drive if the automatic stapler is electrically driven. The automatic disc feeder is powered from the same power source as the automatic stapler.

Automatic stapler 10 includes handle 16, trigger 18, and staple holder 20. Staple holder 20 holds a string of staples 21 which feed individual staples to a hammer that expels the staple from hammer channel guide 22 of gun 10. Gun 10 also includes a safety trigger actuator arm 24 which, when the stapler is not depressed (not in a firing position) disables the trigger mechanism internally connected to trigger 18. Gun 10 also includes a spring 26 that has its upper coil attached to the front end 14 of the gun and its lower coil attached to a movable member 28 that is part of the safety mechanism of the gun. Member 28 moves with respect to the balance of the gun.

Figure 2:
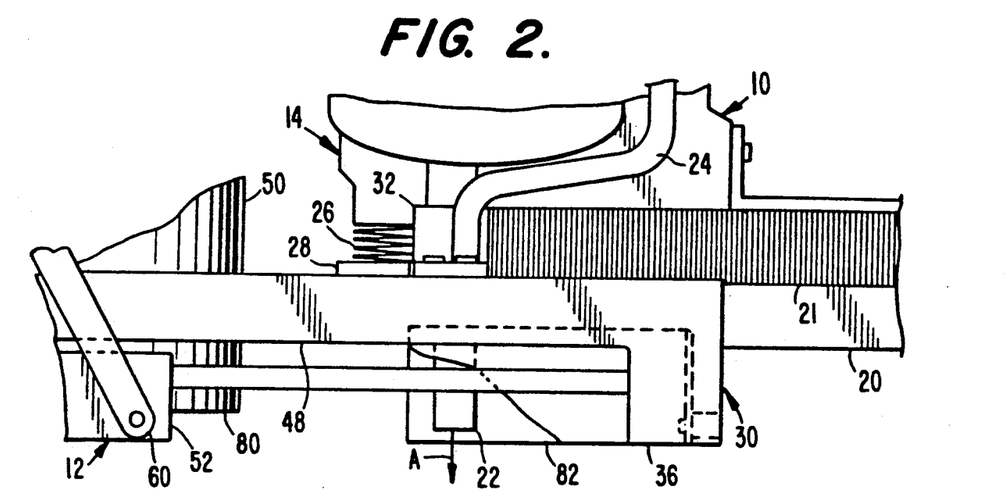

FIG. 2 illustrates a partial, broken away, schematic view of the gun and the rear portion 30 of the automatic disc feeding mechanism 12. Hammer or staple channel guide 22 channels the staples are expelled along the staple expulsion path identified by arrow A. Most of gun 10 and particularly staple hammer guide 22 move with respect to mount 28 and safety guide 32.

In the disabled mode (FIG. 1A), a staple will not be expelled upon depression of trigger 18 because safety trigger actuator arm 24 has not released the internal safety mechanism of gun 10. In the enabled mode (FIG. 2), coil spring 26 is depressed by the major portions of gun 10 moving vertically downward with respect to mount 28 and guide 32. Particularly, staple hammer guide 22 is in a raised position in the disabled mode (FIG. 1A) and is a lowered or operative position in the enabled mode shown in FIG. 2. By depressing the front top end 34 (FIG. 1A) of gun 10, coil spring 26 is depressed, and safety trigger actuator 24 causes the internal safety mechanism to move. Upon release of the gun safety, trigger 18 is enabled such that upon depression of the trigger, a staple will be expelled along staple expulsion path A out of staple hammer channel guide 22. The surface to be stapled is adjacent lower surface 36 of automatic disc feeder 12.

Figure 1B:
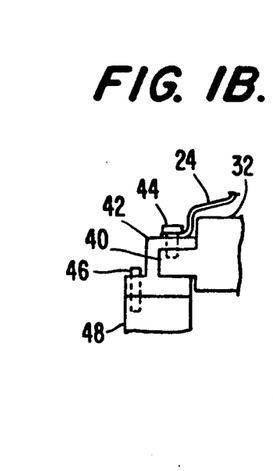
FIG. 1B is a partial, detail schematic illustration of the mounting mechanism of the disc feeder.

FIG. 1B is a broken away, partial schematic view of the mounting mechanism for disc feeder 12. Essentially, gun 10 has a laterally protruding tab 40 onto which is mounted a C-shaped mount 42 which is complementary to tab 40. Bolt 44 attaches C-shaped mount 42 to tab 40. Safety trigger actuator 24 is attached by bolt 44. C-shaped mount 42 is attached by bolt 46 to shuttle guide mount 48. The automatic disc feeder 12 can be mounted to staple gun 10 by other mechanisms. A person of ordinary skill in the art could easily construct other mounting systems for the feeder.

Returning to FIG. 1A, automatic feeder 12 includes a disc canister or container 50, a shuttle guide mount 48, a shuttle 52 and a shuttle drive 54. Shuttle 52 moves fore and aft with respect to, among other things, staple hammer channel guide 22. In the illustrated embodiment, shuttle 52 is moved by shuttle actuator arm 56 as guided by rail 58. A pair of rails pass through shuttle 52 on either side of the shuttle. Shuttle actuator arm 56 is moved from a shuttle disc loading position, shown in FIG. 1A, to a disc retention position shown in the figure as phantom lines. Lower arm region 60 of actuator arm 56 is rotatably connected to shuttle 52. Upper arm region 62 is rotatably attached to plunger end 64. Plunger end 64 is attached to a plunger which is driven by a pneumatic drive 66. The plunger rides on a rail 68 from position B to position C. Position C is shown in phantom lines. In position C, actuator arm 56 is lowered, thereby forcing shuttle 52 from the fore position illustrated in FIG. 1A to the aft position shown in phantom lines in that figure. Although a single chamber pneumatic drive system is shown herein, a double chamber pneumatic drive could be substituted therefor. Pneumatic supply lines 70 and 72 provide power to the pneumatic driver 66. Disc container or canister 50, in this illustrated embodiment, is a rigid canister into which is placed a plurality of stacked discs. At the top of canister 50 is a cap 74. The cap and canister top are locked together by a key 78 and keyway 76 system. The bottom of canister 50 is attached to shuttle guide mount 48. The bottom 80 of canister 50 is in very close proximity to the disc carriage that will be discussed in detail hereinafter.

To retain the disc in a position normal to staple expulsion path A, a retention clip 82 is provided. Retention clip 82 is mounted at an interior position 84 to the interior wall of mount 48 near aft end 30 thereof.

Since the staples and discs must be placed relatively close together on the roof, about one foot apart, a pair of wheels, one of which is wheel 86, or a curved surface 88 are mounted near fore end 90 of automatic disc feeder 12. Wheel 86 could be eliminated and the automatic feeder and staple gun combination could be moved simply by pushing the staple gun combination forward on curved surface 88.

FIG. 2 is a detail view of the mechanism with the retention clip 82 partially broken away to expose staple hammer channel guide 22. When gun 10 is depressed and in an enabled mode, as shown in FIG. 2, the gun bears down further on automatic disc feeder 12. In other words, the disc feeder is fixedly mounted to the safety mechanisms of the safety gun since the gun proper, represented by staple hammer channel guide 22, moves up and down with respect to the automatic disc feeder. Compare, for example, the position of staple string 21 in FIG. 1A to the position of staple string 21 with respect to shuttle guide mount 48 in FIG. 2.

Figure 3A:
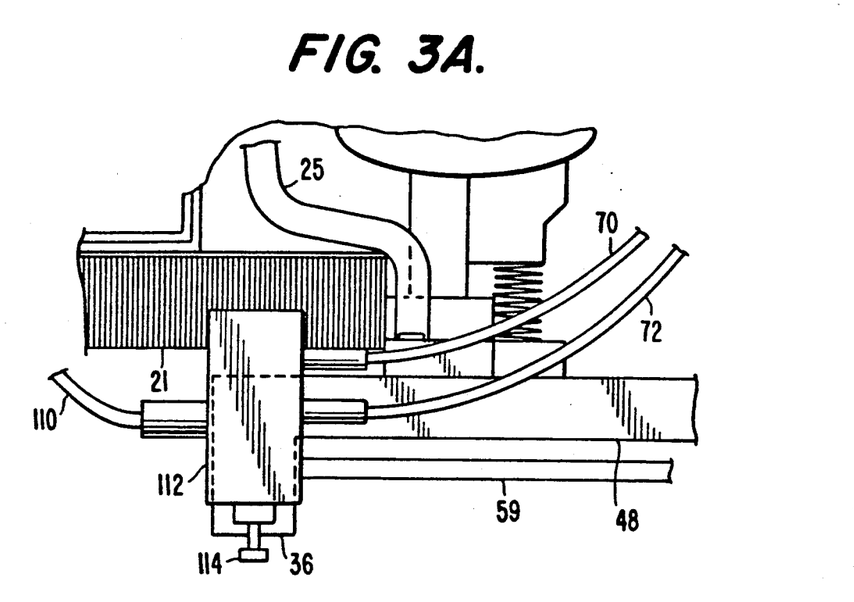
FIGS. 3A and 3B schematically illustrate the power source switch for the automatic disc feeding mechanism in an open state and in a closed state, respectively.

FIG. 3A schematically illustrates the right-hand side of the staple gun in detail, showing the power switch mechanism for the automatic disc feeder. Pressurized air supply hose 110 has one end connected to the pneumatic supply hose (not shown) of the staple gun. The other end of supply hose 110 is attached to pneumatic switch 112. Feeder hoses 70 and 72 are connected at the output of pneumatic switch 112. Switch 112 is actuated by plunger 114. In the stapler disabled mode, that is, in the mode illustrated in FIG. 1A, plunger 114 is fully extended beyond lower surface 36 of shuttle guide mount 48. In the enabled mode, shown in FIG. 3B, plunger 114 is depressed and its lower surface is co-planar with surface 36. FIG. 3A also illustrates the right side guide rail 59 and the right side safety trigger actuator arm 25.

Figure 3B:
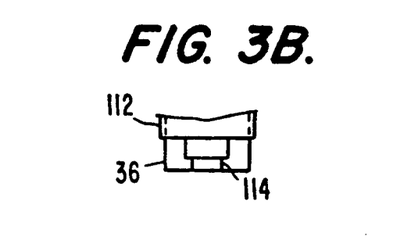

When plunger 114 is fully extended, shown in FIG. 3A, shuttle 52 is in the disc retention position adjacent retention clip 82. This position is shown in phantom lines in FIG. 1A. When switch plunger 114 is depressed, as shown in FIG. 3B, shuttle 52 is in the disc loading position, shown by the solid lines in FIG. 1A.

Figure 4:
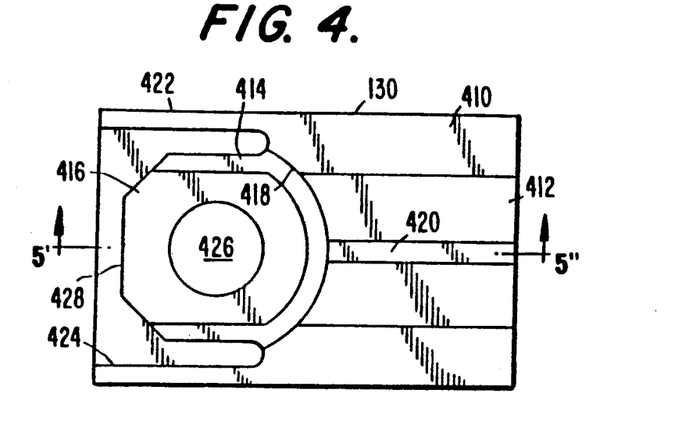
FIG. 4 illustrates a top view of the shuttle carriage.
Figure 5:
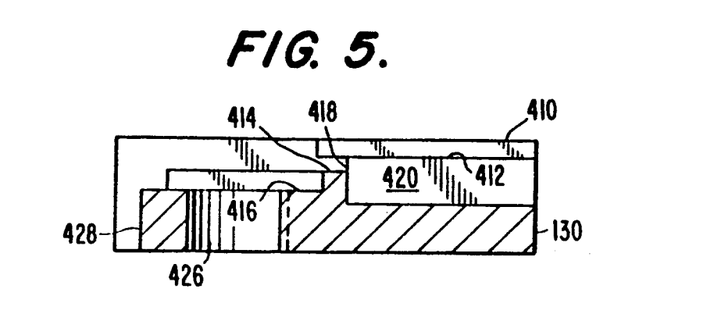
FIG. 5 illustrates a cross-sectional view of the shuttle carriage from the perspective of section line 5'—5" in FIG. 4.
Figure 6:
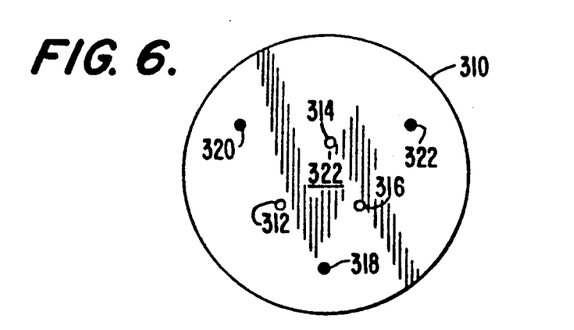
FIG. 6 illustrates one embodiment of the disc having dimples.
Figure 7:
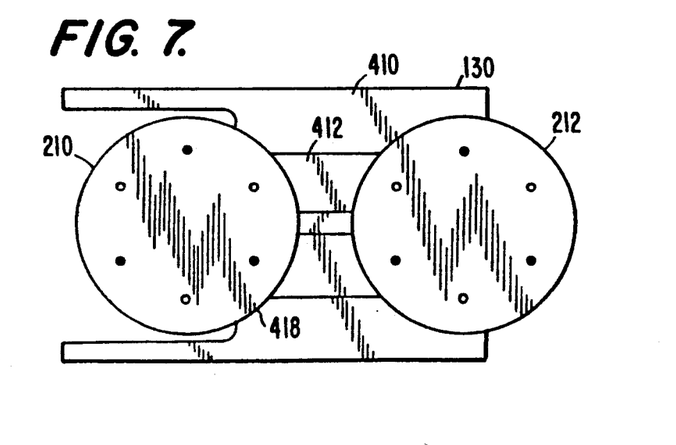
FIG. 7 schematically illustrates the shuttle carriage in an intermediate position and carrying one disc to the retention clip while maintaining the static position of the successive disc in the stack of discs.

FIG. 4 illustrates a top view of disc carrier or carriage 130. FIG. 5 is a cross-sectional view of disc carriage 130 from the perspective of section line 5'—5" in FIG. 4. The disc carriage is part of the shuttle which moves fore and aft in the automatic disc feeder. FIG. 7 illustrates a schematic top view of carriage 130 with a first disc 210 loaded into the carriage and a second disc 212, which is the next or successive disc in the stack of discs held by the canister, on the fore end planar regions of carriage 130. FIG. 6 illustrates a disc or tab 310 having a plurality of nubs or dimples or that protrude from the top and bottom planar surfaces of the disc. As illustrated, disc 310 has dimples 312, 314 and 316 protruding upward from the top surface of the disc. These dimples are represented by open circles in this figure. Disc 310 also has dimples 318, 320 and 322 protruding from the opposing or bottom planar surface of the disc. These dimples are represented by solid or filled-in circles. The dimples are placed in a peripherally spaced band about central region 322 of the disc. Therefore, in the illustrated circular disc, the band of dimples begins at, for example, about ¼" from the periphery of disc 310. The width of the band depends upon the pattern selected for the dimples. The pattern of upwardly protruding dimples formed by dimples 318, 320 and 322 is a equilateral triangle having legs of a certain distance. The downwardly protruding dimples 312, 314 and 316 also form an equilateral triangle. However, the size of the equilateral triangle formed by the downwardly protruding dimples is different from the size of the equilateral triangle formed by the upwardly protruding dimples. Therefore, the dimples or nubs are predisposed in non-equivalent, opposing patterns in a peripherally spaced band on either planar surface of the tab or disc.

This feature of the disc enables the discs, when stacked in the disc canister or container, to be separated from one another. Such separation ensures that there is no planar contact between adjacent discs. Without planar contact, the discs can be more easily withdrawn from the stack. However, it has been found that discs having dimples protruding in only one direction may be sufficient. Also, if the discs or tabs are thick enough or have a low coefficient of friction on their planar surfaces, the dimples may not be necessary for the proper operation of the automatic disc feeding apparatus. The current best mode of the invention is to utilize discs having opposing dimples in nonequivalent banded patterns.

The discs are carried by carriage 130 on planar surfaces located beyond the band of nubs or dimples. Carriage 30 has a top planar surface 410 which keeps the next successive disc 212 in a static position relative to the disc container and the stack discs above it. Therefore, the downwardly protruding dimples of disc 212 are not held or affected by top surface 410. Only planar disc regions beyond the band of protrusions are carried or held by surface 410. To accomplish this, carriage 130 has a second surface 412 that is below top surface 410. In one embodiment, the depth of second surface 412 is 0.02" and the discs have a thickness of 0.01". To load the disc onto carriage 130, the carriage has a third planar surface 414. Planar surface 414 supports loaded disc 210 by affecting the lower surface of that disc at peripheral planar regions beyond the band of dimples which are downwardly protruding from the disc. Carriage 130 has a fourth planar surface 416 which provides a space for those downwardly protruding dimples. Edge 418 linking the second surface 412 to the third surface 414 is a pushing surface which forces loaded disc 210 from the stack of discs into the retention clip, as will be discussed in detail hereinafter. In a currently preferred embodiment, carriage 130 is made of aluminum. Pushing surface 418 may be reinforced by steel or other harder metal such that that the edge will not deteriorate upon repetitive, multiple uses of carriage 130.

Carriage 130 also includes a guide channel 420 such that the carriage and its associated shuttle mount (discussed later with reference to FIG. 8) move fore and aft smoothly. A key depends downward from the canister 50 into channel 420 to guide the carriage. Carriage 130 also includes forwardly protruding arms 422 and 424 which provide additional stability to the device. A bore 426 is defined by tongue region 428. It has been found that some operators trigger the staple gun very rapidly and that, upon occasion, carriage 130 has not been withdrawn from the staple expulsion path before the staple has been expelled from the gun. If the staple is expelled from the gun while carriage 130 is in the disc retention position, the aft position, the staple will penetrate the loaded disc 210 and protrude through bore 426 thereby preventing significant damage to the carriage.

FIG. 7 illustrates loaded disc 210 with a peripheral edge region adjacent push edge 41 of carriage 130.

Figure 8:
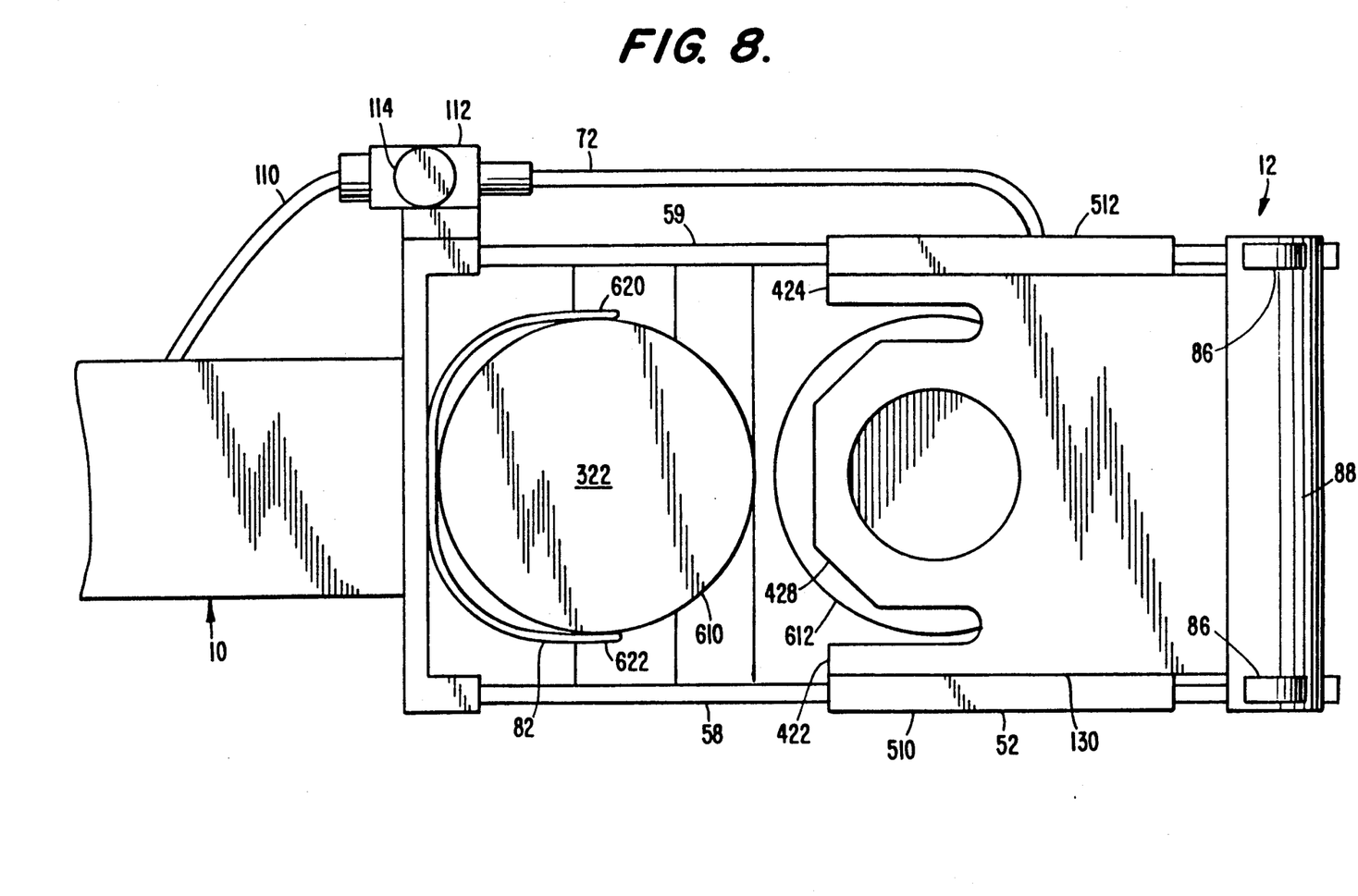
FIG. 8 schematically illustrates a bottom view of the automatic feeding mechanism and the staple gun with a disc retained by the retention clip and the shuttle carriage loaded with the next successive disc from the stack.

FIG. 8 is a schematic view of the bottom of staple gun 10 and automatic disc feeder 12. FIG. 8 clearly shows guide rails 58 and 59 for shuttle 52. Shuttle 52 includes carriage 130 and the carriage slide mounts 510 and 512 through which pass guide rails 58 and 59, respectively. As shown in FIG. 8, disc 610 is retained or held by retention clip 682. The successive disc, disc 612, is loaded onto planar surface 414 (FIGS. 4 and 5) of carriage 130. In this position, the stack of discs are aligned on top of the successive, carriage loaded disc 612. Upon actuation of trigger 18 (FIG. 1A), a staple would be expelled along the staple expulsion path through central disc region 322 of retained disc 610.

Disc 610 is retained by retention clip 82 in a position normal to the staple expulsion path. The staple would penetrate the disc and then attach itself to the roof or other structure in its path. As best shown in FIG. 8, the U-shaped channels between carriage legs 422 and 424 and tongue 428 enable carriage 130 to be partially inserted into retention clip 82. In other words, the U-shaped retention clip 82 has legs 620 and 622 which protrude into the U-shaped channels of carriage 130 when the carriage is in the disc retention position.

Figure 9A:
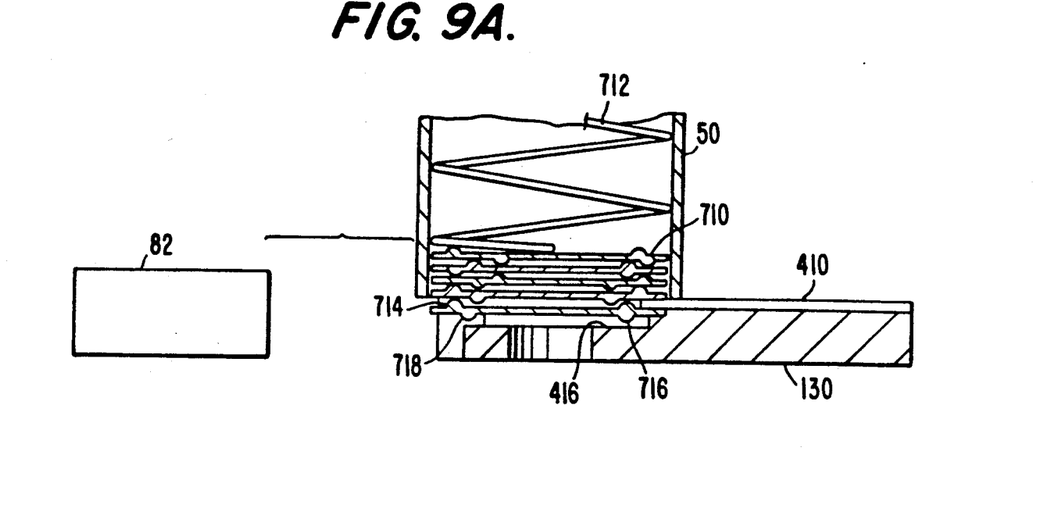
FIGS. 9A, 9B and 9C respectively illustrate the shuttle carriage in a disc loading position, an intermediate position where the shuttle carriage maintains the successive disc in a static position relative to the stack of discs, and in a disc retention position wherein the first disc is peripherally grasped by the retention clip.
Figure 9B:
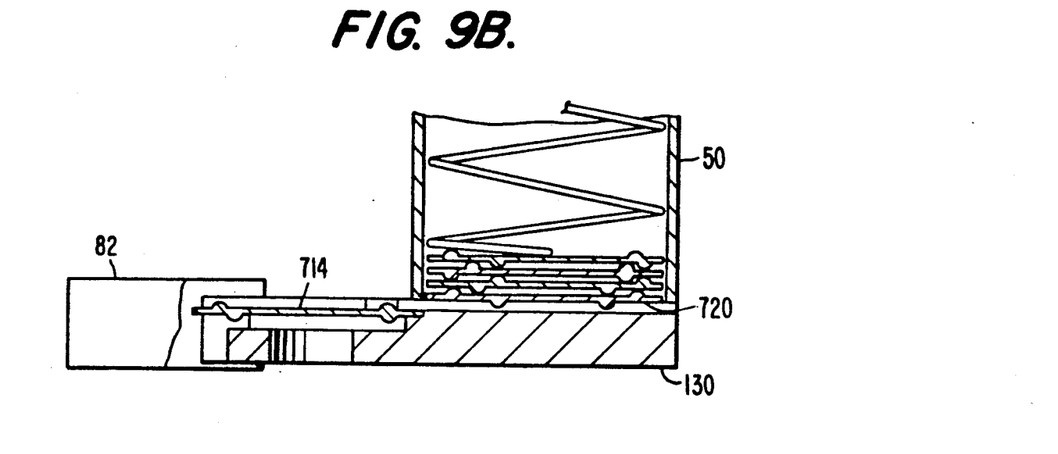
Figure 9C:
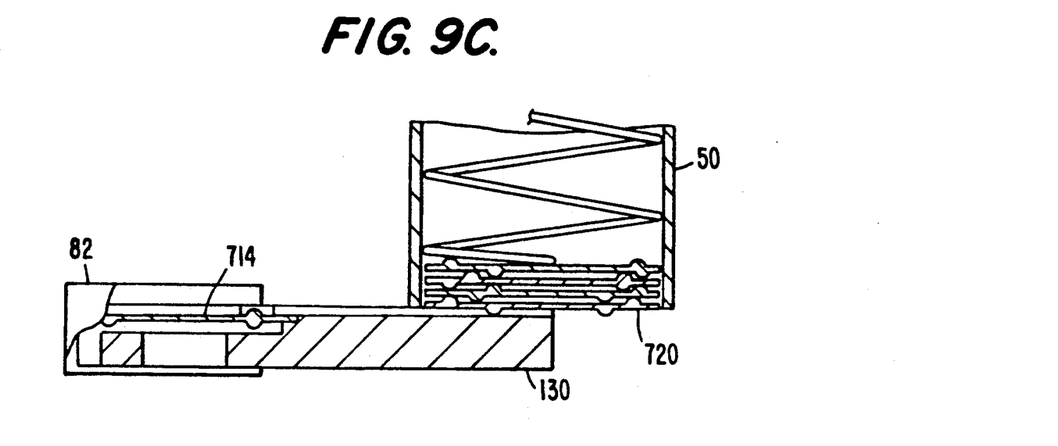

FIGS. 9A, 9B and 9C schematically illustrate the loading position for carriage 130, an intermediate position, and a disc retention position, respectively. FIG. 9A illustrates canister 50 holding a plurality of discs, one of which is disc 710. A coil spring 712 forces the disc down since the staple gun and feeding mechanism is subjected to considerable jostling and movement during its operation. Disc 714 has been loaded onto carriage 130 in FIG. 9A. Dimples 716 and 718 are spaced from surface 416 of the disc, thereby enabling smooth operation of the shuttle.

In FIG. 9B, carriage 130 is intermediate the disc loading position (FIG. 9A) and the disc retention position (FIG. 9C). In FIG. 9B, the next or successive disc 720 is held in a static position with respect to the remaining discs because that disc rides on top surface 410 of carriage 130. This feature ensures that the stacked discs do not jump up and down during the shuttling step.

In FIG. 9C, loaded disc 714 is inserted into retention clip 82. Again, successive disc 720 is maintained in a static position relative to the other discs in the stack. As used herein "static position" refers to a condition whereby the discs do not move up and down when the carriage moves back and forth due to the space provided for the depending dimples. The loaded disc 417 is inserted into retention clip 82 and the clip 82 grasps the periphery of that disc. When carriage 130 is withdrawn or moved to the right in FIG. 9C and disc 714 remains within retention clip 82. Thereafter, when carriage 130 reaches it foremost position, as shown in FIG. 9A, the successive disc is loaded onto the carriage. At that time, the operator of the staple gun can fire the gun thereby stapling the disc or tab to the surface to be stapled.

Figure 10:
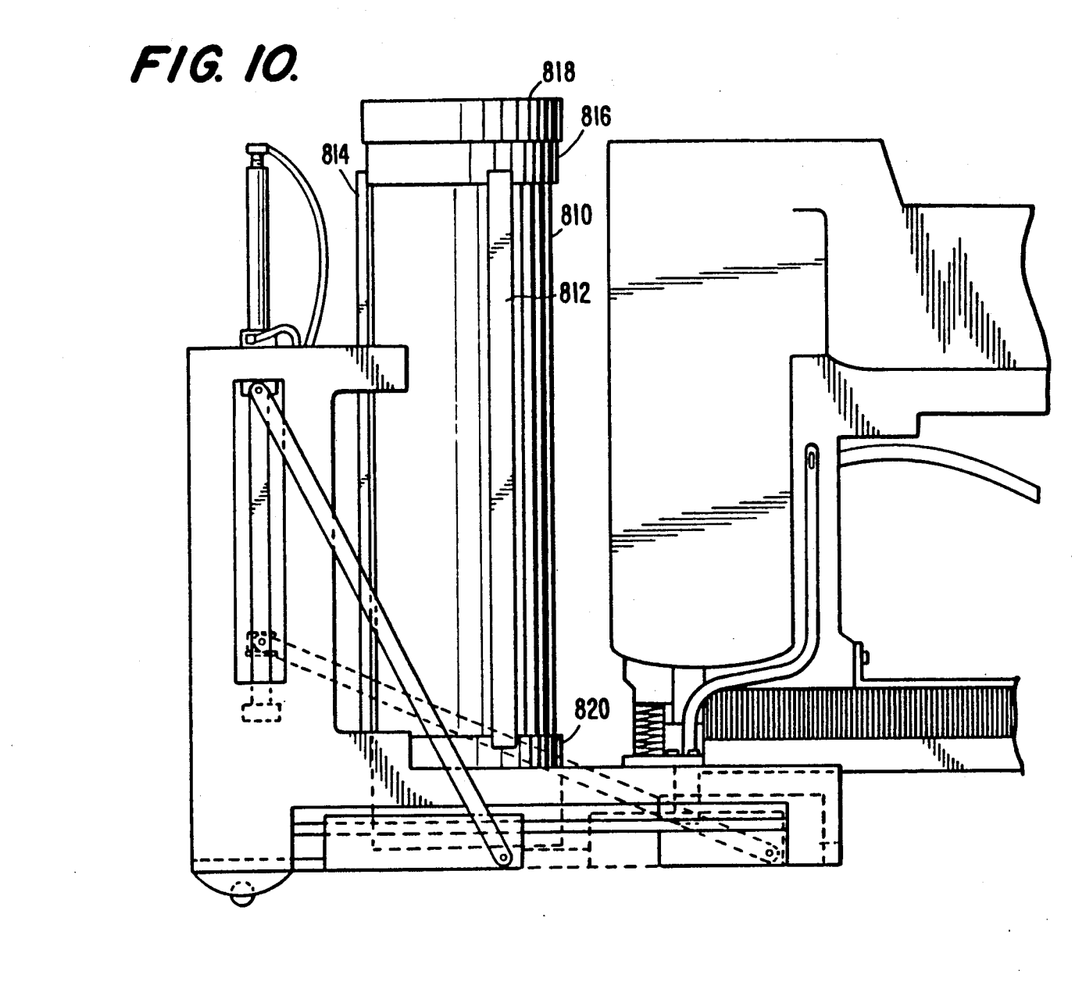
FIG. 10 schematically illustrates a removable container for the discs and, the mounting system for such a container.

FIG. 10 illustrates another embodiment of the present invention wherein a removable canister or container 810 is held b vertical mounts consisting of legs 812 and 814 and collar 816. Cap 818 locks removable container 810 to the mount in a way similar to cap 74 and canister 50 in FIG. 1A. A lower collar 820 holds the lower region of removable canister 810.

Figure 11:
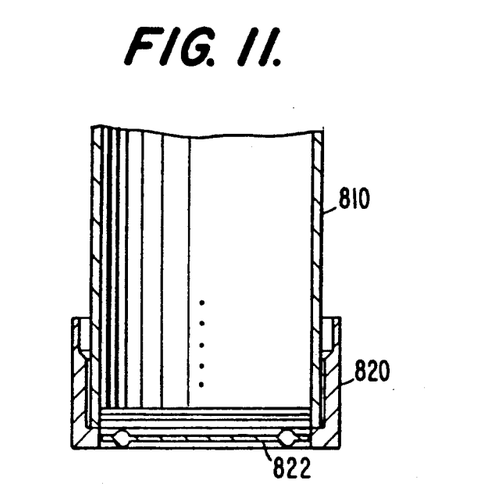
FIG. 11 is a detailed, cross-sectional view of the removable container for the stack of discs.

FIG. 11 schematically illustrates the lower region of removable canister 810. Collar 820 retains the lower edge of the canister such that the stacked discs 822 are not affected by the transition between removable canister 810 and collar 820.

In the currently preferred embodiment, most of the elements of the automatic feeder are made of aluminum in order to reduce the weight of the feeder. In the first illustrated embodiment beginning with FIG. 1A, canister 50 is a thin walled aluminum container. In the second embodiment illustrated in FIGS. 10 and 11, the removable canister 810 is a cardboard container. Therefore, the discs can be specially manufactured and loaded into a lightweight cardboard container 810 and the removable container can be loaded into the vertical mounting mechanism illustrated in FIG. 10 above.

Figure 12:
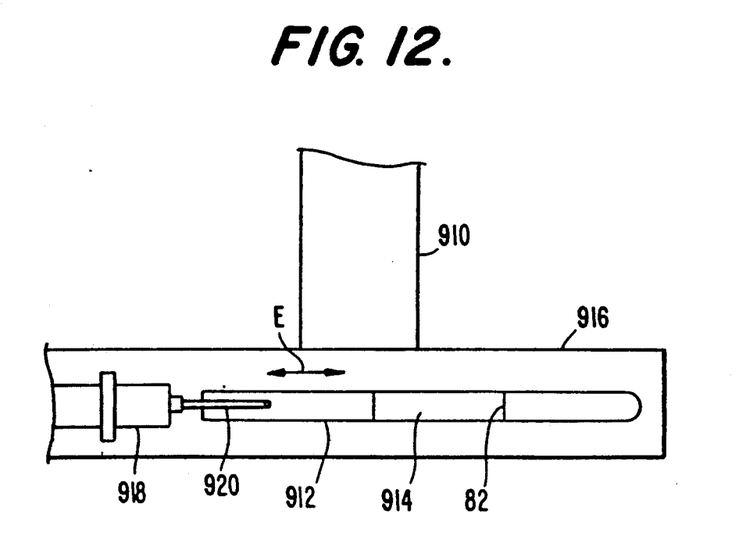
FIG. 12 illustrates a drive system for moving the shuttle carriage which is aligned with the shuttle carriage itself.

FIG. 12 schematically illustrates a longitudinally aligned drive for the shuttle. The container holding the stacked discs or tabs is illustrated as column 910. The shuttle 912 has laterally protruding tongues which co-act with a channel 914 defined by mount 916. Mount 916 corresponds in general to guide rail mount 48 in FIG. 1A. However, instead of having the shuttle ride back and forth on rails, the shuttle has a tongue which laterally protrudes into open channel 914 in mount 916. A tongue and channel is also provided on the other lateral side of the shuttle.

Shuttle 912 could be moved fore and aft, as shown by double headed arrow E, by an aligned drive 918. As illustrated in FIG. 12, aligned drive 918 has actuator arm 920 which is mounted or attached to shuttle 912.

If the staple gun were electrically driven, aligned drive 918 could be a solenoid wherein drive rod 920 moves in direction E thereby moving shuttle 912 fore and aft.

Rather than use a retention clip, the clip may be replaced with a permanent magnet that retains the disc in a position normal to the expulsion path of the staple or nail. Further, although a staple gun has been described in detail herein, the automatic disc feeder could be mounted on an automatic nail gun. The claims appended hereto are meant to cover these embodiments of the invention.

To summarize the operation of the automatic feeder, upon first usage, the operator would depress front end 34 of gun 10 down on the surface to be stapled. Such an action would compress switch plunger 114 and shuttle 52 would move forward from the aftmost position or the disc retention position to a foremost position or a disc loading position. The first disc would then be loaded onto the carriage. The operator would then lift the gun and switch plunger 114 would be extended. This would cause the carriage and shuttle to move rearward to the disc retention position. The first disc would then be grasped by the retention clip. Upon a second depression of the gun and switch actuator, the shuttle moves forward, leaving the first disc in the retention clip. The next disc is then loaded, by spring action, onto the carriage. The operator then depresses the trigger and fires the staple through the disc and into the roof. By repeatedly lifting the gun, discs are fed to the retention clip and staples are fired therethrough. This mechanism ensures that the staples are always fired through the center of the disc.

The claims appended hereto are meant to cover modifications and changes within the spirit and scope of the present invention.

What is claimed is:

1. A disc for use in an automated disc feeding, powdered staple or nail gun, said disc having two opposing, substantially flat, solid planar surfaces and a plurality of raised surfaces protruding from at least one of said planar surfaces such that when a plurality of said discs are stacked on top of each other, no planar surfaces contact, said disc being penetrable by nails and staples.

2. The disc according to claim 1, wherein a plurality of raised surfaces protrude from both of said planar surfaces of said disc in opposing patterns, the pattern of said raised surfaces protruding from one of said planar surfaces being non-equivalent to the opposing pattern of raised surfaces protruding from the other of said planar surfaces.

3. The disc according to claim 2, wherein said patterns are equilateral triangles and the size of the triangle of raised surfaces protruding from one of said planar surfaces is different than the size of the triangle of raised surfaces protruding from the other of said planar surfaces.

4. The disc according to claim 3, wherein three dimples protrude from each of said planar surfaces.

5. A stack of discs for use in an automatic disc feeding, powered staple or nail gun, comprising:
a plurality of discs having opposing, substantially flat planar surfaces arranged in stacked relationship along an axis transverse to said planar surfaces, each of said discs having means for separating said planar surfaces and each of said discs being penetrable by nails and staples.

6. The stack of discs according to claim 5, wherein said separating means is a raised surface protruding from at least one of said planar surfaces of each of said discs.

7. The stack of discs according to claim 6, wherein said raised surface is a plurality of dimples.

8. The stack of discs according to claim 5, wherein said separating means comprises raised surfaces protruding from both of said planar surfaces of each of said discs.

9. The stack of discs according to claim 8, wherein said raised surfaces comprise a plurality of dimples.

10. The stack of discs according to claim 9, wherein a first portion of said dimples extends from one of said planar surfaces of each of said discs in a non-equivalent pattern relative to a pattern of an opposing second portion of dimples on the other of said planar surfaces.

11. A disc for use in an automated disc feeding, powered staple or nail gun, comprising:
a disc having a plurality of dimples protruding from both planar surfaces of said disc, said dimples being predisposed in non-equivalent opposing patterns in a peripherally spaced band on either planar surface, said disc being penetrable by staples and nails.

12. A disc according to claim 11, wherein said pattern is an equilateral triangle and the size of the triangle of dimples protruding from one planar surface is different than the size of the equilateral triangle of dimples protruding from the other planar surface.

13. The disc according to claim 12, wherein three dimples protrude from either planar surface.

* * * * *